United States Patent [19]
Koble, Jr.

[11] Patent Number: 5,718,847
[45] Date of Patent: Feb. 17, 1998

[54] AUTOMATIC SIPHON DRAIN APPARATUS AND METHOD

[76] Inventor: Robert L. Koble, Jr., 1898 Pearl Dr., Camp Verde, Ariz. 86322

[21] Appl. No.: 666,616

[22] Filed: Jun. 18, 1996

[51] Int. Cl.$^6$ ............................................. B01F 3/04
[52] U.S. Cl. .......................... 261/97; 137/107; 137/132; 137/142; 137/151; 261/DIG. 46
[58] Field of Search .................. 261/97, DIG. 46; 137/107, 132, 142, 151, 133, 138

[56] References Cited

U.S. PATENT DOCUMENTS

| | | | |
|---|---|---|---|
| 196,997 | 11/1877 | Steitz | 137/151 |
| 753,174 | 2/1904 | Smith | 137/133 |
| 1,462,082 | 7/1923 | Carr | 137/142 |
| 1,582,399 | 4/1926 | Helander | |
| 1,661,202 | 3/1928 | Thayer | 137/142 |
| 2,828,761 | 4/1958 | Weibert, Jr. | 137/132 |
| 2,959,184 | 11/1960 | Mahan | 137/142 |
| 3,640,302 | 2/1972 | Willinger | 137/142 |
| 4,289,713 | 9/1981 | Goettl | |
| 4,333,887 | 6/1982 | Goettl | |
| 4,361,522 | 11/1982 | Goettl | 137/132 |
| 4,573,490 | 3/1986 | Kaletsky | 137/132 |
| 4,576,013 | 3/1986 | Sperr et al. | |
| 5,292,103 | 3/1994 | West et al. | |
| 5,374,380 | 12/1994 | James | |

FOREIGN PATENT DOCUMENTS

661680  11/1951  United Kingdom ................. 137/142

Primary Examiner—Tim R. Miles
Attorney, Agent, or Firm—H. Gordon Shields

[57] ABSTRACT

Drain apparatus drains an evaporative cooler housing by siphon action. The siphoning action is started when a pump which pumps water for cooler pads is turned off, and the water in a conduit flows downwardly and a valve is switched, directing the downwardly flowing water into a chamber disposed over the overflow standpipe in the housing. The water level in the chamber is the water level in the housing, and the down flowing water fills the chamber, causing the water to flow down the pipe and lowering the atmospheric pressure in the chamber to begin siphoning action. At the same time, a check valve at the bottom of the chamber opens to allow water from the housing to flow into the chamber to drain the housing. Several embodiments are disclosed, including embodiments in which siphoning action may be commenced by raising and lowering a drain hose connected to the standpipe.

46 Claims, 6 Drawing Sheets

AUTOMATIC SIPHON DRAIN APPARATUS AND METHOD

BACKGROUND OF THE INVENTION

1. Field of the Invention

This invention relates to siphon drain apparatus, and more particularly, to the automatic draining of evaporative coolers utilizing siphoning action.

2. Description of the Prior Art

U.S. Pat. No. 4,333,887 (Goettl) discloses a solenoid actuated siphon apparatus for periodically draining the sump portion of an evaporative cooler. Siphoning action is begun when the solenoid is actuated to move a drain valve below the water level to commence siphoning action. When the water level is lowered to the point that the siphoning action is no longer maintained, the sump is then refilled with incoming water. The solenoid is de-energized to return the siphon drain position upwardly to its non siphoning position.

U.S. Pat. No. 4,361,522 (Goettl) discloses another solenoid actuated siphon apparatus for draining an evaporative cooler. The siphon apparatus of the '522 patent is different from that of the '713 patent, but both have the common ancestry. The siphoning action in the '522 patent is begun by an injector directing water under pressure into a siphon drain valve again, when the water level drops below a certain level, the siphoning action is lost, and the slump is refilled.

U.S. Pat. No. 4,576,013 (Sperr et al) discloses the use of two separate pumps, one pump for pumping water to evaporative cooler pads, and a second pump for draining the evaporative cooler. The two pumps operate separately, with the drain pump being actuated each time the evaporative cooler is turned on. The action of the two pumps is controlled for predetermined time periods which begin each time the evaporative cooler is turned on.

U.S. Pat. No. 1,582,399 (Helander) discloses two embodiments of a siphon pump. One embodiment of a siphon pump utilizes a bulb which is squeezed and released for pumping action, and the second embodiment comprises a piston type pump. One-way check valves are utilized in both embodiments.

U.S. Pat. No. 2,642,888 (Danel) discloses siphon pumps utilizing valve elements.

U.S. Pat. No. 4,289,713 (Goettl) discloses siphon apparatus for draining an evaporative cooler in which siphoning action is commenced by the return of water pumped upwardly to soak evaporative cooler pads. The water returns downwardly to a slump when the evaporative cooler pump turns off. When the water level drops below the top of the siphon valve, the siphoning action stops and the sump is refilled by makeup water. The siphoning action occurs periodically in response to a timer which stops the evaporative cooler pump.

U.S. Pat. No. 5,292,103 (West et al) discloses valve apparatus for draining the sump of an evaporative cooler. The valve is spring loaded to its open position, and is held in its closed position by water pressure. When the water pressure is removed, the spring causes the valve to open, thus allowing the evaporative cooler sump to drain. When water pressure is applied to the valve, the valve closes and clean water refills the sump.

U.S. Pat. No. 5,374,380 (James) discloses a valve apparatus for draining an evaporative cooler in which the sump is drained by actuation of a solenoid valve. Control of the solenoid valve is accomplished through sensor elements which sense resistance in water. As salinity increases, the resistance decreases and, when the resistance drops below a predetermined level, the drain solenoid is actuated.

SUMMARY OF THE INVENTION

The invention described and claimed herein comprises a siphon apparatus for draining an evaporative cooler. Siphoning action is accomplished by the return of water pumped upwards by an evaporative cooler pump. A valve in a conduit from the pump to the pads controls the flow of the water. Water pumped upwardly closes the valve, and when the pump is turned off, the downward flow of the water causes the valve to switch, allowing the water to flow to the siphon valve and thus to commence the siphoning action to drain the sump. The siphon valve may be adjusted vertically to control the height of the water in the sump. When the water level drops to the predetermined height, siphon action is lost and the makeup water then fills the sump. Thus, when the evaporative cooler pump is turned on, the pads will be saturated with mostly clean, fresh water.

Among the objects of the present invention are the following:

To provide new and useful apparatus for draining an evaporative cooler sump;

To provide new and useful siphon apparatus for draining an evaporative cooler sump;

To provide new and useful sump apparatus in which siphoning action is commenced by return water flowing downwardly in a supply line for saturating evaporative cooler pads;

To provide new and useful apparatus for draining a sump from which a liquid is pumped upwardly;

To provide new and useful apparatus for draining a sump from which a pumped liquid is used to start a siphoning action;

To provide new and useful siphon apparatus in which the water height is controlled by the position of the siphon valve;

To provide new and useful siphon apparatus for an evaporative cooler utilizing valves to control the flow of water;

To provide new and useful apparatus for draining an evaporative cooler sump each time an evaporative cooler pump is turned off; and To provide new and useful siphon apparatus that can continue to provide water to saturate evaporative cooler pads during the siphoning cycle and the draining of the evaporative cooler sump.

DESCRIPTION OF THE PREFERRED EMBODIMENT

Figures 1, 4, 7, 11, 14:
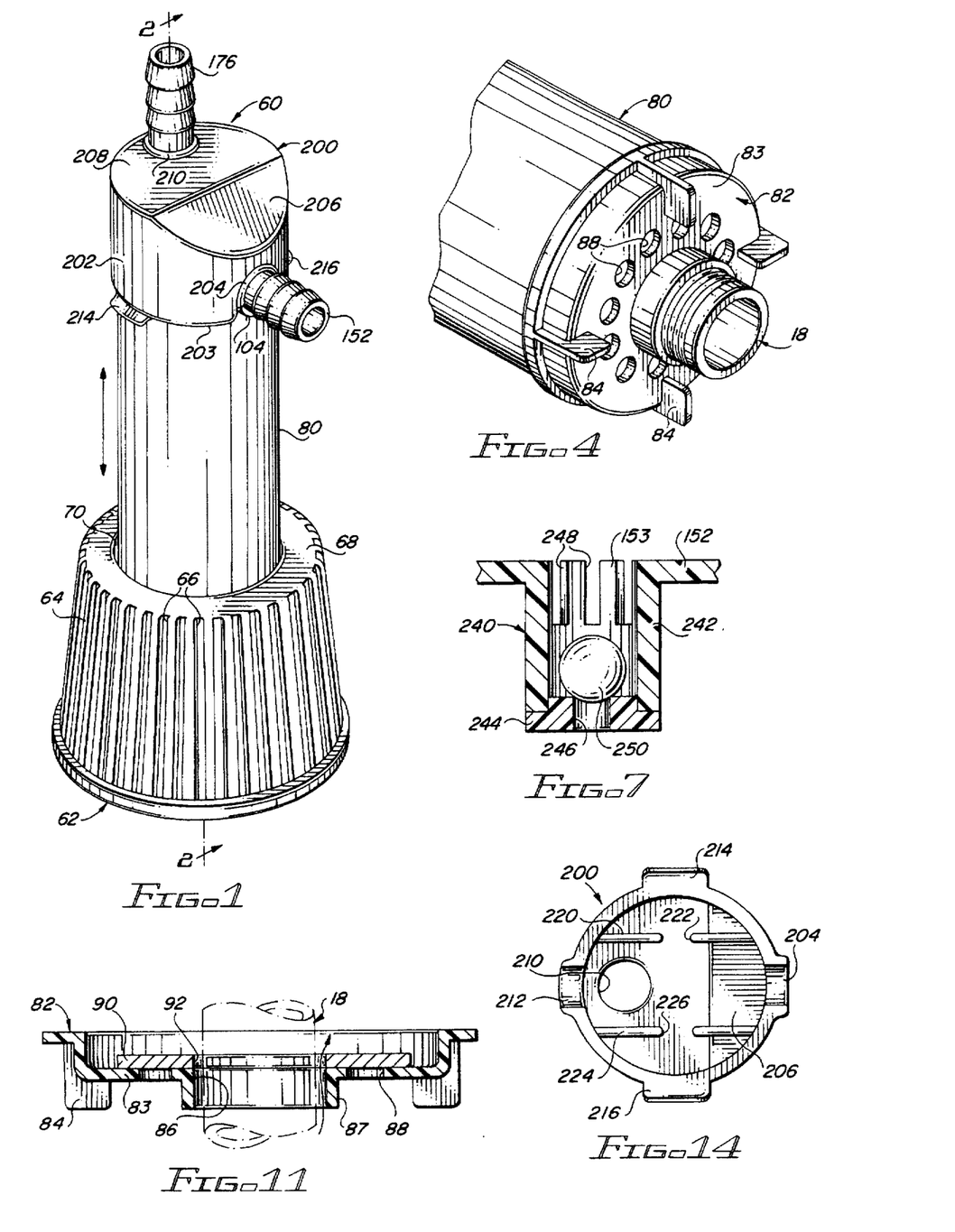
FIG. 1 is a perspective view of siphon apparatus of the present invention.
FIG. 4 is a perspective view of a portion of the apparatus of the present invention.
FIG. 7 is a view in partial section of a portion of the apparatus of the present invention.
FIG. 11 is a view in partial section taken generally along line 11—11 of FIG. 10.
FIG. 14 is a bottom view of a portion of the apparatus of the present invention.

FIG. 1 is a perspective view of siphon drain apparatus 60 of the present invention. The siphon drain apparatus 60 includes a bottom outer basket 62 which is disposed about the lower portion of a siphon cylinder 80. Disposed on the upper portion of the cylinder 80 is a cap 200. Within the cap 200 is a check valve assembly, which will be discussed in detail below.

Figure 2:
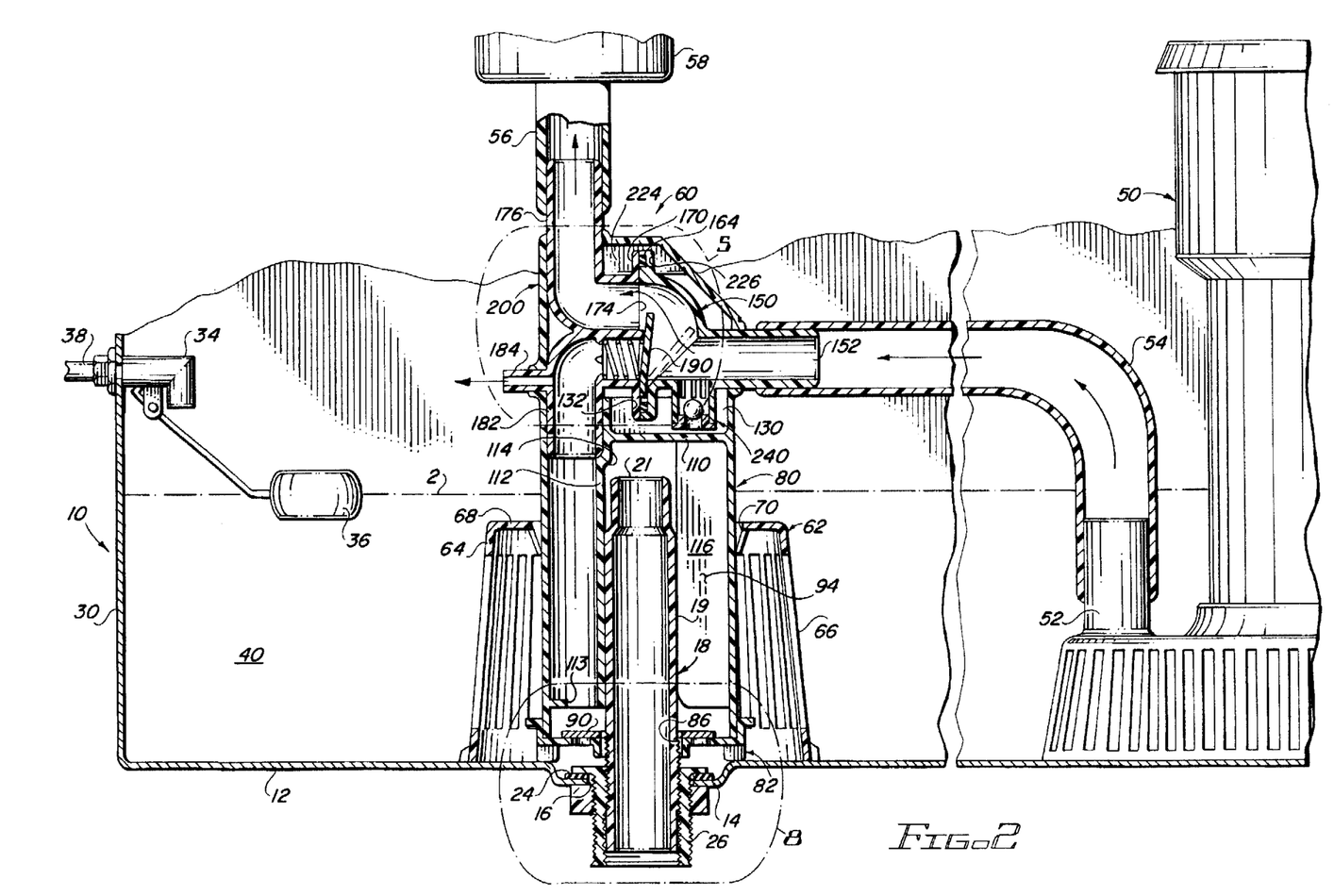
FIG. 2 is a view in partial section of an evaporative cooler sump illustrating the apparatus of the present invention in its use environment, with the siphon apparatus taken generally along line 2—2 of FIG. 1.

FIG. 2 is a view in partial section through an evaporative cooler housing 10 and through the siphon drain apparatus 60 of the present invention. The evaporative cooler housing 10 comprises a use environment of the siphon drain apparatus 60.

Figure 3:
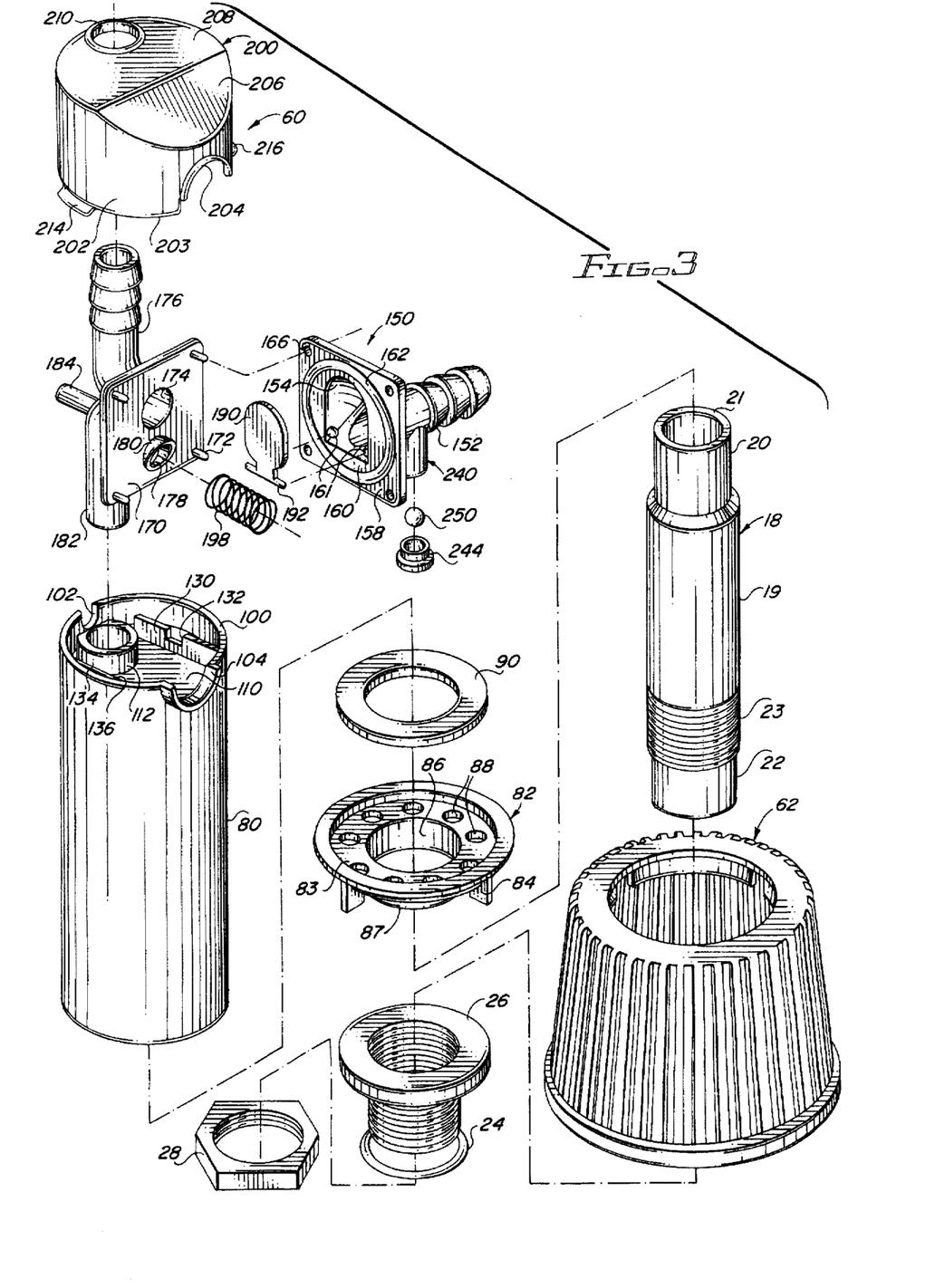
FIG. 3 is an exploded perspective view of the siphon apparatus of the present invention.

FIG. 3 comprises an exploded perspective view of the siphon drain apparatus 60 of the present invention, showing a check valve assembly 150 disposed apart from the cylinder 80 and from the cap 200. As indicated above, the check valve assembly 150 is disposed within the cap 200 and is connected to the top portion of the cylinder 80.

FIG. 4 is a perspective view of the bottom of the cylinder 80 showing element associated therewith.

Figure 5:
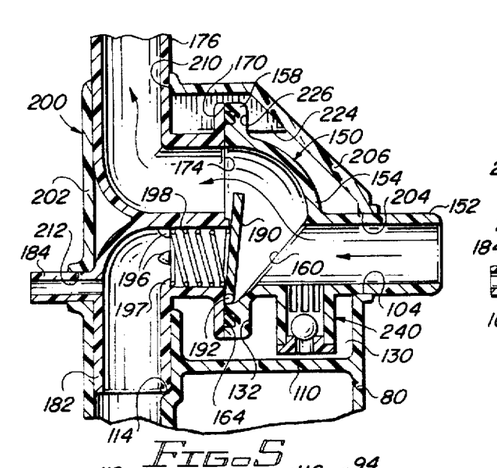
FIG. 5 is an enlarged view in partial section taken generally from oval 5 of FIG. 2.

FIG. 5 is an enlarged view in partial section taken generally from oval 5 of FIG. 2, illustrating the elements involved in the check valve assembly 150.

Figure 6:
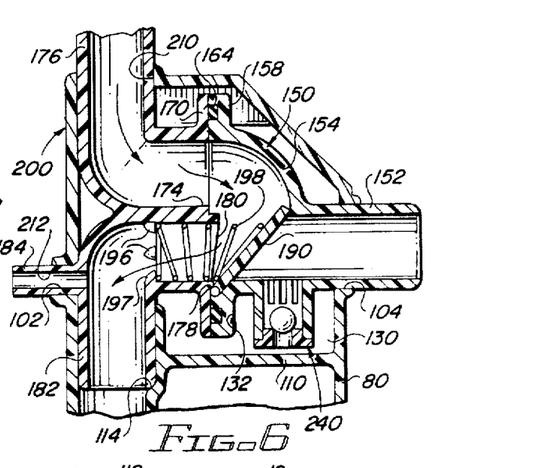
FIG. 6 is a view in partial section of the apparatus of FIG. 5 illustrating the operation of a valve element shown in FIG. 5.

FIG. 6 is a view in partial section sequentially illustrating the operation of the check valve assembly from that shown in FIG. 5.

FIG. 7 is a view in partial section of a check valve on a portion of the check valve assembly 150.

Figure 8:
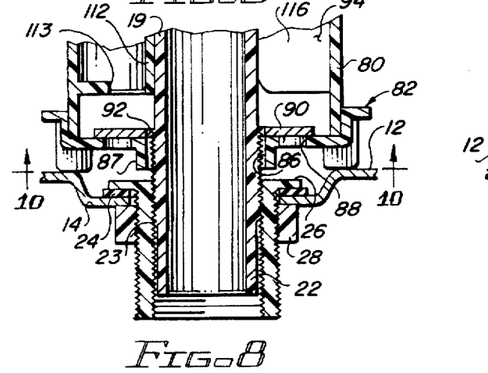
FIG. 8 is an enlarged view in partial section taken generally from oval 8 of FIG. 2.

FIG. 8 is an enlarged view in partial section taken generally from oval 8 of FIG. 2, illustrating elements associated with a bottom or lower check valve.

Figure 9:
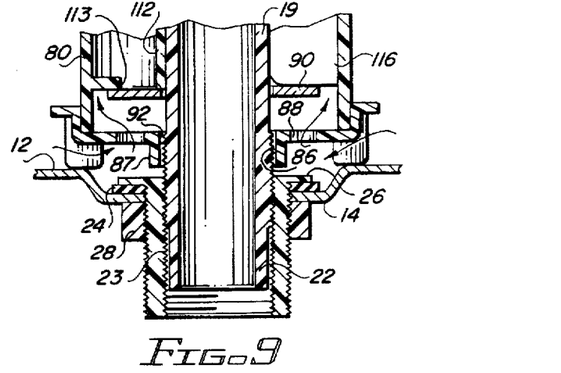
FIG. 9 is a view in partial section of the apparatus of FIG. 8 illustrating the actuation of a portion thereof.

FIG. 9 is also a view in partial section of a lower portion of the cylinder 80, sequentially following FIG. 8 and illustrating the operation of the lower check valve.

Figures 10, 12:
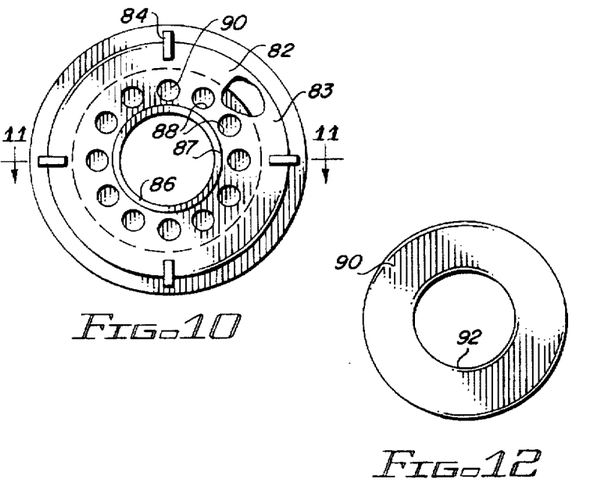
FIG. 10 is a view of a portion of the apparatus of the present invention taken generally along line 10—10 of FIG. 8.
FIG. 12 is a plan view of an element of the present invention.

FIG. 10 is a bottom view of a portion of the cylinder 80, namely a bottom wall assembly 82 which is associated with the lower check valve assembly. FIG. 10 is taken generally along line 10—10 of FIG. 8.

FIG. 11 comprises a view in partial section through the bottom wall assembly 82, taken generally along line 11—11 of FIG. 10.

FIG. 12 is a plan view of a check valve 90 associated with the bottom wall assembly 82.

Figure 13:
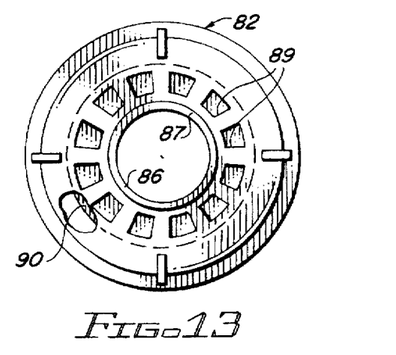
FIG. 13 is a bottom view illustrating an alternate embodiment of the apparatus shown in FIG. 10.

FIG. 13 is a bottom view of an alternate embodiment of the bottom wall assembly 82 illustrating a different configuration of drain apertures from that illustrated in FIG. 10.

FIG. 14 is a bottom view of the cap 200.

Specific Figures will be referred to as appropriate.

The use environment of the siphon drain apparatus 60 is illustrated in FIG. 2, which discloses the evaporative cooler housing 10 in which is disposed the siphon drain apparatus 60 and an evaporative cooler pump 50. The evaporative cooler housing 10 includes a bottom wall 12 on which the evaporative cooler pump 50 is disposed.

The bottom 12 includes a dimple 14 in which there is an aperture through which extends an overflow standpipe 18.

The standpipe 18 includes a central portion 19, an upper portion 20, with a top 21 thereon, and a lower portion 22. At the bottom of the central portion 19 are threads 23. The outer diameter of the central portion 19 and its threads 23 is greater than the outer diameters of the upper portion 20 and the lower portion 22.

The standpipe 18 is held in place by a flanged bushing 26 on the inside of the dimple 14. A gasket 24 is disposed between the bushing 26 and the dimple 14.

The bushing 26 is held on the dimple 14 by a nut 28. The bushing 26 is illustrated as having external threads extending below the nut 28 to which a garden hose, or the like, may be secured.

The upper portion 20 of the standpipe 18 is smoothly tapered and terminates in the top 21. The lower portion 22 extends below the externally threaded portion 23. The threaded portion 23 is illustrated as engaging the internal threads of the bushing 26.

The extension 22 helps to fill the cavity in the bushing 26 below the threaded portion 23 of the standpipe 18. Essentially, the extension 22 prevents water flowing through the standpipe 18 during the siphoning process described below from flowing outwardly into an area or volume larger than the area or volume of the standpipe. The outward flowing may cause air bubbles to form. If such bubbles form and join together into a large bubble or bubbles as they flow upwardly, the bubble or bubbles may force the water up and prevent the siphoning action from occurring. Thus, the extension 22 helps to prevent such bubble action.

As is well known in the art, the flanged bushing 26 may or may not have internal threads. If the bushing 26 has internal threads, as shown, it will threadedly engage with the external threads 23 of the overflow standpipe 18. If the bushing 26 has no internal threads, and has instead a smoothly tapered opening, the overflow standpipe 18 can then be turned over (or inverted from that shown) and the smaller, tapered end 20 of the overflow standpipe 18 can be compressionally and securely inserted into the bushing 26.

Extending upwardly from the bottom 12 are shown two walls 30 and 40. Extending through the wall 30, as is well known and understood in the art, is a valve 34. A float 36 is appropriately secured to the valve 34 and controls the flow of water through the valve 34 and into the housing 10. A water input conduit 38 is appropriately secured to the valve 34.

The normal liquid level or level of the water within the evaporative cooler housing 10 is shown by reference numeral 2. It will be noted that the water level line 2 extends through the float 36. When the level 2 of the water drops, the float 36 drops with it, allowing water to flow from the conduit 38 through the valve 34 and into the housing 10.

The overflow pipe or standpipe 18 includes the top 21, which is shown as being disposed above the desired water level 2.

The purpose of the standpipe 18 is to allow excess water to drain from the evaporative cooler housing should the water level exceed the desired indicated level 2. That is, if the valve 34 sticks in the open position, with the float 36 extending downwardly from that shown in FIG. 2, and should the level of the water rise, the rising water will flow over the top 21 of the standpipe 18 and drain downwardly and thus outwardly from the evaporative cooler housing 10.

Insofar as the apparatus of the present invention is concerned, the evaporative cooler pump 50 includes an output nozzle or pipe 52 to which is connected a conduit 54. The conduit 54 extends to the siphon apparatus 60. A second conduit 56 extends from the apparatus 60 upwardly. Water pumped by the pump 50 flows through the conduit 54, and through a portion of the siphon apparatus 60, and upwardly through the conduit 56 to a water distribution manifold (not shown) which distributes water to soak the pads (not shown) secured to the evaporative cooler housing 10.

The siphon drain apparatus 60 is frictionally disposed about the standpipe 18. This will be discussed in detail below.

As shown in FIGS. 1 and 2, the siphon drain apparatus 60 includes a lower, outer basket 62. The basket 62 includes an outer wall 64 through which extend a plurality of slots 66. The basket 62 also includes a top wall 68 which extends inwardly from the outer wall 64. Inwardly from the outer wall 64, the top wall 68 terminates in a downwardly and inwardly extending upper inner wall 70 which is generally concentrically disposed with respect to the outer wall 64 and receives the siphon cylinder 80.

The purpose of the downwardly and inwardly extending upper inner wall 70 is to frictionally engage the siphon cylinder 80. That is, with the outer basket 62 disposed on the bottom 12 of the evaporative cooler housing 10, the cylinder 80 may be positioned vertically relative to the pipe 18, as desired. The frictional engagement between the inner wall 70 and the cylinder 80 will hold the outer basket 62 in place.

Secured to the bottom of the cylinder 80 is a bottom wall assembly 82. The bottom wall assembly 82 is shown in partial section in FIG. 2, is shown in perspective in FIG. 4, and is shown in plan view in FIG. 10, and is shown in partial section in FIG. 11. For the following discussion, reference will primarily be made to those Figures. FIG. 11 is enlarged substantially to show the relationship between the bottom wall assembly 82 and the standpipe 18.

The bottom wall assembly is shown as being somewhat cup shaped with a bottom wall 83 and an upwardly extending side wall and outwardly extending flange for purposes of assembly. The bottom wall assembly 82 includes downwardly extending feet 84 spaced apart from each other arcuately to insure that there is a space between the bottom 12 of the evaporative cooler housing 10 and the main portion of the bottom wall assembly 82.

Extending through the bottom wall 83 is a central aperture 86 through which the standpipe 18 extends. The stand pipe 18 is shown in dash dot lines in FIG. 11.

A ring 87 extends downwardly about the aperture 86. The ring 87 has a height equal to that of the feet 84. The purpose of the ring 87 is to insure that the cylinder 80 cannot be disposed on the standpipe bushing 26 on those evaporative coolers in which the standpipe dimple has a greater diameter than that of the feet 84. In such case, the cylinder 80 could be pushed downwardly against the standpipe bushing 26 until the ring 87 acted as a stand off element.

It will be noted, also, that some evaporative coolers may not have a dimple. Again, the cylinder 80 could be pushed downwardly until the ring 87 is disposed against the top of the bushing 26.

Radially outwardly and disposed about the central aperture 86 are holes 88. The holes or apertures 88 extend through the bottom wall 83. For siphon purposes, the water in the evaporative cooler housing 10 flows through the apertures 88, while under normal circumstances, water flows through the aperture 86 into the interior of the cylinder 80. As may best be understood from FIG. 11, the diameter of the central aperture 86 is somewhat larger than the outer diameter of the standpipe 18. The large arrow in FIG. 11 shows the path of the water flowing into the interior of the cylinder 80 outwardly from the standpipe 18 and through the aperture 86.

Disposed over the apertures 88 in the bottom wall assembly 82 is a ring shaped check valve or check washer 90. The check valve 90 is shown in plan view in FIG. 12, and in partial section in FIG. 11.

The check valve 90 includes a central aperture 92 which is about the same diameter as the aperture 86. Accordingly, with the check valve 90 disposed on the bottom wall 83 of the bottom wall assembly 82, the apertures 88 are easily covered, but there is still sufficient space between the standpipe 18 and the generally aligned apertures 86 and 92 to allow for the flow of water into the interior of the cylinder 80.

The water level within the cylinder 80 will be the same as the water level 2 outside of the siphon drain apparatus 60 until the siphoning action begins. This is so, of course, since the water will easily flow into the interior of the cylinder 80, as discussed above.

The check valve 90 is preferably made of a material having a specific gravity greater than 1 (one) so as to be more dense than water. The check valve 90 will accordingly overlay the apertures 88 to prevent water from flowing downwardly through the apertures 88 at the beginning of the siphon action. Then, when the siphoning action begins, as will be discussed below, the check valve 90 moves upwardly under the force of the inrushing water during the siphoning action to uncover or open the path through the apertures 88.

FIG. 13 comprises a bottom view of the bottom wall assembly 82 showing an alternate configuration of apertures 89 through which water flows during the siphoning action. In the embodiment of FIG. 13, the plurality of apertures 89 have a different configuration from that shown best in FIG. 10. The apertures 89 have a radial and arcuate configuration in that the apertures have a "top" and a "bottom" which are arcuately extending generally parallel to the central aperture 86, and the sides of each aperture are generally radially extending. The configuration of the apertures 89 accordingly is a modified trapezoid.

For the following discussion, return generally to FIGS. 2, 3, 5, and 6. The cylinder 80 includes a top rim 100, (see FIG.

3), and two recesses extend downwardly from the rim 100. At the "rear" of the cylinder 80 is a small recess 102 (see FIG. 3), and at the "front" of the cylinder 80 there is a relatively large recess 104, best shown in FIG. 3. Both recesses include an outwardly extending flange. The large flanged recess 104 and the relatively small flanged recess 102 cooperate with the check valve assembly 150.

Downwardly from the rim 100 is a top wall 110. Extending through the top wall 110, and adjacent to the relatively small recess 102, is a pipe 112. The pipe 112 extends slightly above the top wall 110, and as shown in FIG. 2, extends downwardly into the cylinder 80 beneath the top wall 110 and terminates above the bottom wall assembly 82. The pipe 112 includes an internal upper shoulder 114 slightly below the top wall 110. The shoulder 114 cooperates with a portion of the check valve assembly 150, as shown in FIGS. 2, 5, and 6.

At the bottom of the pipe 112 is a blocking flange 113. The flange 113 extends across part of the pipe 112 and cooperates with check valve element 90 to block the pipe 112 during the siphoning action. When the check valve or check washer element 90 moves upwardly during siphoning, as shown in FIG. 9, the pipe 112 is blocked to prevent air from being sucked down into the siphon chamber 94. Such air, if not stopped, could stop the siphon process. The only time the blockage is important is when the pump 50 is off. If the pump 50 is pumping during the siphoning and draining process, water will be flowing and the pipe 112 will be blocked at the rim 180 by the flapper element 190.

Beneath the top wall 110, and extending radially inwardly from the cylinder 80, are fins 116. The cylinder 80 preferably includes a pair of fins 116, if desired.

The fins 116 extend downwardly from the top wall 110 and terminate above the bottom wall assembly 82 and are generally aligned with the bottom of the pipe 112. The fins 116 and the pipe 112 provide a frictional engagement with the standpipe 18 to allow the cylinder 80 to be adjusted vertically relative to the standpipe 18, as discussed above.

The shoulder 114 limits the downward movement of the cylinder 80 relative to the pipe 18. This is best shown in FIG. 2. Thus, with the shoulder 114, there is always a space above the rim 21 of the pipe 18 and beneath the bottom wall 110 through which water may flow into the pipe 18 and downwardly, out of the evaporative cooler housing 10, during both an overflow situation and a siphoning action.

A siphon chamber 94 is defined within the cylinder 80 between the top wall 110 and the bottom wall 83.

In FIG. 3, the check valve assembly 150 is shown exploded and spaced apart between the cylinder 80 and the cap 200. The check valve assembly 150 includes generally six elements: a housing 154, an o-ring 164 (see FIGS. 5 and 6), a valve 190, a plate 170, a spring 198, and a cap 200. The elements will be discussed in detail below. The elements are shown appropriately secured together in FIGS. 2, 5, and 6.

A pipe or conduit 152 extends outwardly from the flapper housing 154. The housing 154 is essentially an enlarged continuation of the pipe 152 through which water flows from the pump 50 upwardly to soak the evaporative cooler pads (not shown). The flapper housing 154 has a rim 158. The rim 158 has a generally square configuration, as best shown in FIG. 3.

A valve seat or face 160 extends from the rim 158 inwardly and upwardly to the juncture of the housing 154 and the pipe 152. The face 160 is again best shown in FIG. 3, but is also shown in side profile in FIG. 5. A pair of protrusions 161 extend slightly outwardly from the lower portion of the face 160.

An O-ring groove 162 extends into the rim 158, as shown in FIG. 3, and receives an O-ring 164. The O-ring 164 is shown best in FIGS. 5 and 6.

The rim 158 also includes four alignment apertures 166. The purpose of the alignment apertures 166 is to receive mating pins 172 of a valve plate 170. The rim 158 is generally of a flat, planar configuration as it faces the valve plate 170. The valve plate 170 has a generally flat or planar configuration to matingly engage the rim 158. Four alignment pins 172 are shown in FIG. 3 extending outwardly from the plate 170 and extending into the alignment apertures 166, as indicated above.

Two apertures extend through the plate 170. They include an upper aperture 174 which extends to an upper pipe 176, and a lower aperture 178 which extends to a pipe 182. The pipe 182 extends downwardly into the upper portion of the pipe 112 of the cylinder 80.

Extending outwardly from the plate 170 about the aperture 178 is a tapered rim 180. The tapered rim 180 extends slightly into the flapper housing 154, as best shown in FIGS. 5 and 6.

The diameter of the aperture 174 is slightly larger than the diameter of the aperture 178, but the diameter of the pipe 176 is substantially the same as the diameter of the aperture 178 and its pipe 182. The reason for the difference in the diameters of the apertures 174 and 178 is to compensate for the presence of a flapper valve 190.

The flapper valve 190 comprises a plate which is disposed at the lower portion of the face 160 at the juncture of the rim 158 and the plate 170. The flapper valve 190 includes a bottom pivot foot 192 which is disposed and trapped below the two elements 161, as discussed above, on the valve face 160. The valve 190 pivots on the foot 192 in response to the flow of water, as will be discussed below.

A relatively small locator pipe 184 extends outwardly from the recess 102 of the cylinder 80. As shown in FIG. 3, the recess 102 extends downwardly from the top rim 100. The pipe 184 helps to locate and align the various associated elements.

The pipe 152 extends outwardly from the flanged recess 104. The recess 104 also extends downwardly from the rim 100. The recesses 102 and 104 are diametrically aligned with each other, and the pipes 176 and 182 are vertically aligned with each other.

The bottom of the pipe 182 is disposed against the recess 114 when the pipe 184 is disposed on the recess 102 and when the pipe 152 is disposed in the recess 104.

With the generally square rim 158, which essentially comprises a place, disposed against the plate 170, and with the O-ring 164 in its O-ring groove 162, and with the flapper valve 190 set in place, the two elements 158 and 170, or the lower portions of the two elements 158 and 170, are appropriately disposed within the recesses 132 and 136 in the walls 130 and 134, respectively. This is best shown in FIGS. 5 and 6.

With the two elements 158 and 170 disposed in the recesses, the pipe 152 is disposed in the recess 104, and the pipe 182 is disposed within the pipe 112 and against the shoulder 114, and the locator pipe 184 is disposed on the recess 102. The flapper valve 190 is then free to pivot between the valve seat or face 160 and the rim 180 in response to the flow of water.

The cap 200 is shown in FIGS. 1 and 2. The cap 200 is shown disposed over the check valve assembly 150 and disposed on the cylinder 80 in FIGS. 1 and 2, and is shown spaced apart from the check valve assembly 150 in FIG. 3. The cap 200 is shown in FIGS. 5 and 6 disposed on the check valve assembly 150. The check valve assembly 150 is in turn disposed on the cylinder 80. For the following discussion of the cap 200, reference will primarily be made to FIGS. 1, 3, 5, and 6.

The cap 200 includes a generally cylindrical element 202 having two recesses extending upwardly from a bottom rim 203. There is a front flanged recess 204 which is aligned with the flanged recess 104 of the cylinder 80. There is a rear recess 212 which is aligned with the recess 102 in the cylinder 80. As discussed above, the pipe 152 is disposed within the recesses 104 and 204, and the pipe 184 is disposed within the recesses 102 and 212.

There is a sloping front wall portion 206 which starts above the recess 204 and extends upwardly and inwardly to a top wall portion 208. Extending upwardly to the top wall portion 208, and remote from the sloping wall portion 206, is a top pipe aperture 210. As shown in FIGS. 1, 5, and 6, the pipe 176 extends through the pipe aperture 210.

The purpose of the cap 200 is essentially to hold the check valve assembly 150 in place relative to the cylinder 80.

The bottom portion of the cap 200 fits downwardly over the outer portion of the cylinder 80. This may be understood from FIGS. 1,3, and 14. In FIGS. 1 and 3, the recess 204 is shown extending upwardly above a bottom rim 203 of the cylinder 202. In FIG. 1, the bottom rim 203 is shown extending below the pipe 152 and below the upper portion of the flanged recess 104 of the cylinder 80.

The flange 204 is shown extending outwardly from the cylinder 202 adjacent to the bottom rim 203. The purpose of the flange 204 and a second flange 212, is to aid in assembling the cap 200 to the check valve assembly 150 and the cylinder 80.

The cap 200 snaps into place to hold the O-ring 164 in place to insure a seal between the flapper housing 154 and the valve plate 170 and its associated pipes 176 and 182. The cap 200 includes slots 222 and 226, shown in FIG. 14, which correspond to the slots 132 and 136 of the cylinder 80. The slots 222 and 226 are in ribs 220 and 224, respectively.

FIG. 14 comprises a plan view of the inside of the cap 200. The slots 132 and 136 in the ribs 130 and 134 (See FIG. 3) cooperate with the slots 222 and 226 to hold the check valve assembly 150 together and to secure the assembly 150 to the cylinder 80.

Referring now primarily to FIG. 2, and also to FIGS. 5 and 6, the movement of the flapper valve 190 may be understood. In FIG. 2 and in FIG. 5, there are relatively large solid arrows showing the flow of water upwardly from the nozzle or pipe 52 of the pump 50 through the conduit 54, and to the pipe 152 of the flapper valve assembly 150. In response to the positive flow of water from the pump 50, the flapper valve 190 will pivot from the dash dot position shown in FIG. 2 upwardly to the solid position shown in FIG. 2 with the valve 190 disposed against the rim 180. This is also shown in FIG. 5.

A relatively weak compression spring 198 is disposed in the horizontal portion of the lower pipe 182 and extends through the aperture 178. The spring 198 extends between stop elements 196 and 197 in the pipe 182 and the flapper valve 190.

The stop elements 196 are simply relatively small longitudinal ribs extending radially inwardly from the wall of the pipe 182. Two of three elements 196 are shown in FIGS. 5 and 6. The stop element 197 is a single inwardly extending element on the bottom of the pipe 182 where the pipe turns ninety degrees from horizontal to vertical.

The spring 198 helps to bias the flapper valve 190 against the seat 160. The force of the flow of water from the pump 50 is sufficient to push the valve 190 away from the seat 160 and against the lower aperture 178 to allow the pumped water to flow upwardly into the upper pipe 176 and on upwardly.

When the pump 50 turns off, the spring 198 aids the flow of water in moving the valve 190 against the seat 160 as the water in the pipe 176 and above flows downwardly through the aperture 178 and into the pipe 182.

In FIGS. 2 and 5, the flow of the water around the plate in the valve housing 154 and into the pipe 176 is clearly illustrated by the solid arrows. The area of the upper aperture 174 available to the flow of water through the pipe 152 and through the housing 154 about the flapper valve 190 is substantially the same as the area of the pipe 152. Accordingly, the flow of the water into the pipe 176 through the aperture 174 and through the housing 154 about the upper portion of the valve 190 is substantially unimpeded.

The upper portion of the valve 190 extends upwardly covering the lower portion of the aperture 174, but does not interfere with the upward flow of water due to the oversized area of the aperture 174 as compared to the cross sectional area of the pipe 152.

With the flapper valve 190 disposed against the tapered rim 180, the flow of water from the pipe 152 is directed through the housing 154 and into the pipe 176. The flapper valve 190 blocks the aperture 178, preventing water from flowing into the pipe 182. The flow of water accordingly is upwardly through the pipe 176, the conduit 56, shown in FIG. 2, and upwardly for purposes of soaking the evaporative cooler pads.

When the pump 50 is turned off, the water remaining in the conduit 56 and the pipe 176 flows downwardly under the force of gravity and against the upper portion of the plate or flapper valve 190. The flapper valve 190 then moves to the position shown in dotted line in FIG. 2 and in solid line in FIG. 6 against the seat 160. With the flapper valve or plate 190 essentially blocking off the flow of water to the pipe 152, the water then flows through the aperture 178 and into the pipe 182 and downwardly into the pipe 112.

The outwardly extending angle of the tapered rim 180 from the face of the plate 170 allows water to flow behind the valve plate 190 and about the aperture 178 and thus prevents surface tension from holding the flapper valve 190 closed against the downward or gravity flow of the water. It will be understood, as best illustrated in FIG. 3, that the width of the flapper valve 190 is greater than the diameter of the aperture 178, and accordingly water is able to flow between the relatively flat face of the plate 170 and the flapper valve 190 when the valve 190 is in the position shown in FIG. 2 and in FIG. 5. Again, this prevents surface tension from holding the valve 190 closed against the downward flow of the water.

FIG. 7 is a view in partial section of a secondary or auxiliary check valve 240 extending downwardly from the pipe 152 and located within the cylinder 80 above the wall 110.

The check valve 240 includes a cylinder 242 extending downwardly from the pipe 152. An opening or aperture 153 in the pipe 152 communicates with the cylinder 242. The cylinder 242 is closed by a bottom cap 244. The cap 244 has an opening or aperture 246 extending through it.

Within the bore of the cylinder is a ball 250. The ball 250 is normally disposed against the aperture 246. The ball 250 is held within the bore of the cylinder 242 by a plurality of stop ribs 248. The ribs 248 extend outwardly within the bore of the cylinder 242, and downwardly from the aperture 153.

As the flapper valve 190 closes against the seat 160, the water in the nozzle or pipe 52, the conduit 54, and the pipe 152 moves by gravity downwardly back to the pump 50. There is a momentary vacuum pressure formed in the pipe 152 adjacent to the flapper valve 190, and that vacuum pressure causes the ball 250 to rise off its seat on the aperture 246. There is a resulting flow of air through the aperture 246 and through the cylinder 242 to the pipe 152. This air allows the water in the pipe 152,. the conduit 54, and the pipe 52 to continue the flow downwardly to and through the pump 50.

The check valve assembly 240 allows a relatively quick closing of the flapper valve 190, with a minimum flow of water from the pipe 176 to flow downwardly through the pipe 152, etc. This maximizes the flow of water downwardly for the siphoning action.

The amount of water in the pipe 176 and in the conduit 56 which flows downwardly is sufficient to raise the level of the water within the cylinder 80 beneath the top wall 110 to completely fill the cylinder and to then flow downwardly into the pipe 18. The filling of the chamber defined within the cylinder 80 beneath the top wall 110 causes the siphon action to begin. Atmospheric pressure on the water within the housing 10 then causes the water to flow through the apertures 88 and causes the check valve 90 to move upwardly. This is illustrated in FIGS. 8 and 9. Essentially, FIG. 8 sequentially follows FIG. 6, illustrating what happens at the bottom portion of the cylinder 80 when the flapper valve 190 is moved to the position shown in FIG. 6, with the water rushing downwardly through the pipes 182 and 112 and into the cylinder 80.

FIG. 8 shows the check valve 90 disposed over the apertures 88, which is the condition of the valve 90 when the water flows from the pump 50 upwardly through the pipe 176 and the conduit 56. However, when the pump 50 is turned off, the flow of water upwardly ceases, and the water then flows downwardly, as shown by the relatively large arrows in FIG. 6.

As indicated above, when the siphon action begins, the flow of water through the apertures 88 pushes the check valve 90 upwardly to the position shown in FIG. 9, where the valve 90 is shown disposed against the bottom of the fins 116 and the bottom of the pipe 112. Water then flows freely through the apertures 88 and upwardly within the cylinder 80, over the top rim 21 of the pipe 18 and outwardly from the evaporative cooler housing 20.

The outflow of the water within the housing 10 under siphoning action is substantially faster than the in flowing water through the valve 34. Accordingly, until the water level within the housing 10 drops below the level of the apertures 88, the siphoning action will continue, with some fresh water being added to the flow of the water within the housing 10. The in flow of the fresh water from the valve 34 helps to flush the "old" water out, by mixing fresh water with the "old" water.

At such time as the water level drops below the level of the apertures 88, the siphoning action will cease and the check valve 90 will drop downwardly covering the apertures 88. Water will then fill the housing 10 to the desired level under the control of the float 36 and the valve 34. As indicated above, water freely flows about the pipe 18 within the apertures 86 and 92 of the bottom wall assembly 82 and the check valve 90, respectively. This has been discussed above and is best illustrated in FIG. 11.

Returning again to FIG. 2, the use of a bottle 58 in the conduit 56 above the siphon apparatus 60 may be necessary in small coolers where there is not sufficient vertical distance between the apparatus 60 and the water distribution manifold to allow the flow of water to form a vacuum to begin the siphon action. That is, there my not be enough water to flow downwardly to fill the interior of the cylinder 80 above the water level 2 to begin the siphoning of the water through the pipe 18. In such case, the use of the bottle 58 in the conduit 56 comprises a storage compartment or reservoir for some of the water pumped upwardly to the water distribution manifold by the pump 50.

When the pump 50 turns off, the water in the conduit 56 and in the bottle 58 flows downwardly, as discussed above, to begin the siphon drain procedure.

The bottle or tank 58 may simply be secured to the wall 40 in any convenient or appropriate manner.

In place of the bottle or tank 58, the diameter of the conduit 56 may simply be enlarged to hold a greater quantity of water than the smaller diameter conduit 56, as illustrated, may hold.

The apparatus of the present invention uses water or other liquid, in the conduit 56 to begin a siphoning action. Or, to perhaps be more nearly correct, the apparatus uses the energy of the water or liquid above the apparatus to begin a siphoning action. Thus, essentially, for drain purposes, the conduit 56, etc., becomes a reservoir for water or other liquid used to start a siphoning action for draining water, or other liquid, from a sump.

It will be noted that turning the pump 50 off for only a few seconds will start the siphoning action. Therefor, the pump 50 may be turned on again to keep the pads soaked while the draining process continues. The siphoning action, once started, will continue until the water level drops below the bottom wall 83 so as to admit air into the siphon chamber within the cylinder 80 to stop the siphon process.

Figure 15:
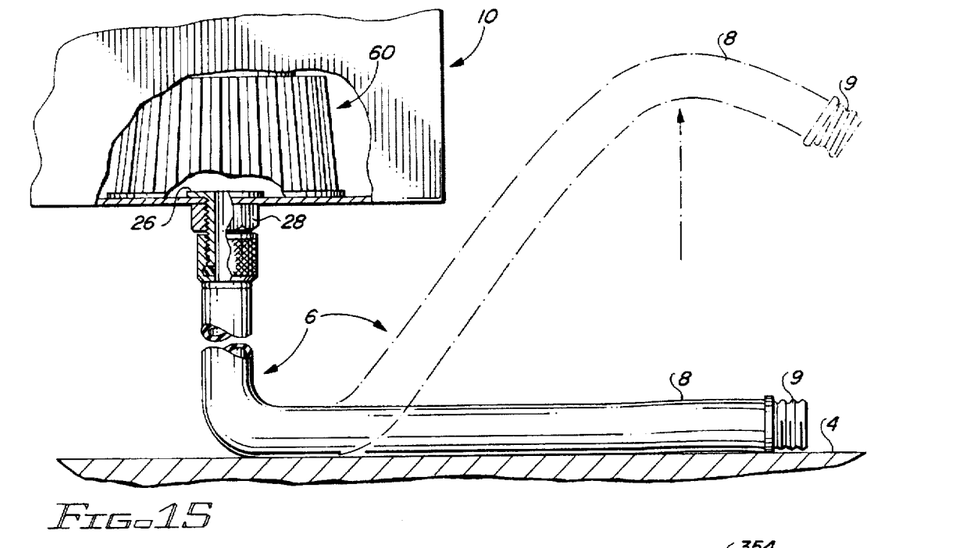
FIG. 15 is a schematic representation of an alternate method of commencing siphoning action with the apparatus of the present invention.

FIG. 15 comprises a schematic representation of the siphon apparatus 60 disposed within the evaporative cooler housing 10, and showing a drain hose 6 secured to the bushing 26.

The hose 6 includes a lower horizontal portion 8 and a discharge end 9. Disposed on ground 4, the lower portion 8 retains water after having been used to drain the sump. This retention of water is typical of any hose which includes a generally horizontal portion, as is well known. It is this remaining water that can be used to actuate the siphoning cycle in a manual method rather than by turning the pump off.

What occurs is that when the discharge end 9 of the hose 6 is picked up, or is snapped up and down, as one would do to move the hose to another location, the water in the lower hose portion 8 rushes back and up into the hose.

This action causes air trapped between the water in the portion 8 and the siphon chamber 94 in the cylinder 80 to compress and put pressure against the water that is inside the cylinder 80. (If enough pressure were applied, the water in the cylinder 80 would be forced out and back into the slump). When the lower portion 8 of the hose 6 is laid back down, the water rushes down or forward, but does not stop at the same location as where it was before the hose was picked up.

When the water rushes back down, it causes a vacuum or low pressure within the cylinder 80 which has only about a cubic inch or so of air to be drawn out. Then atmospheric pressure in the housing 10 takes over. Water rushes into the siphon chamber 94 within the cylinder 80 through the apertures 88, and the check valve or check washer 90 rises to accommodate the in rushing water.

In other words, the trapped water in the hose 6 acts like a piston in a cylinder. When the piston is moved in one direction it compresses air, and then when the piston moves in the opposite direction, it will draw a vacuum.

Thus, even while the pump 50 is still pumping water upwardly, the siphoning action can be commenced by simply moving the lower portion 8 of the drain hose 6 upwardly and then returning it downwardly to commence the siphoning action while the pump 50 continues to pump upwardly to soak the pads. In this manner, the water in the evaporative cooler housing 10 may also be drained while the pads are still being soaked by pumped water. In other words, the siphon action may be commenced at any time, regardless of the status of pump 50.

Pumps used in evaporative coolers vary in their capacity for pumping to a low depth. Pumps may lose their prime if the water level drops below a certain depth. In order to prevent the loss of prime during the siphon draining, the cylinder 80 is adjustable vertically on the standpipe 18. The cylinder 80 is frictionally held on the standpipe by the fins 116 and the pipe 112. The cylinder 80 may accordingly be located vertically on the standpipe 18 at a height or location to insure that the bottom wall 83 and the apertures 88 are above the minimum pumping level of the pump 50.

While the cylinder 80 is adjustable vertically on the standpipe 18, the outer basket 62 is also vertically adjustable on the cylinder 80, as discussed above. Accordingly, once the cylinder 80 is appropriately disposed on the standpipe 18, the basket 62 is then moved downwardly on the cylinder 80 until the bottom of the basket 62 is on the bottom wall 12 of the cooler housing 10. This has been discussed in detail above.

Figure 16:
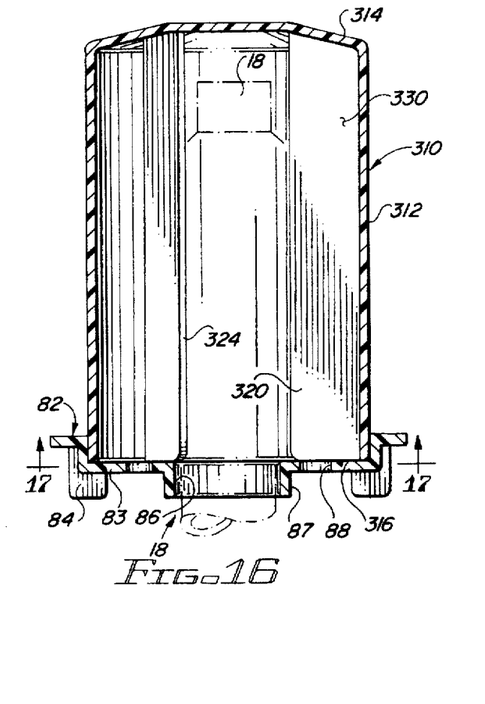
FIG. 16 is a side view in partial section of an alternate embodiment of the apparatus of the present invention.
Figure 17:
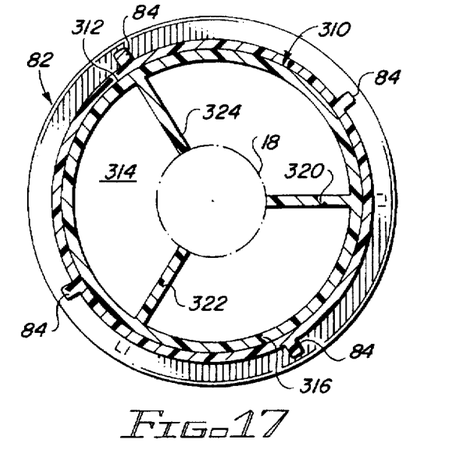
FIG. 17 is a view taken generally along line 17—17 of FIG. 16.

FIG. 16 is a side view in partial section of an alternate embodiment siphon apparatus 310 of the present invention. FIG. 17 is a bottom view of the apparatus 310. For the following discussion, reference will primarily be made to FIGS. 16 and 17. The siphon apparatus 310 utilizes the siphon principle discussed in conjunction with FIG. 15.

The apparatus 310 includes a cylindrical element 312 closed by a top wall 314 and having a bottom rim 316. Within the cylinder 312 are three radially inwardly extending fins 320, 322, and 324. The standpipe 18, shown in dash dot line in FIGS. 16 and 17, is frictionally held by the fins 320, 322, and 324. That is, the siphon apparatus 310 may be adjusted vertically on the standpipe 18, as desired and as discussed above in conjunction with the siphon drain apparatus 60.

The bottom of the cylinder 312 is closed by the bottom wall assembly 82. As discussed above, the bottom wall assembly 82 includes a bottom wall 83, a plurality of stand off feet 84, and the central aperture 86 through which the standpipe 18 extends. About the aperture 86, the ring or rim 86 extends downwardly. The bottom of the ring or flange 87 is on the same plane as the bottom of the stand off feet 84. The purpose of the ring 87 and the feet is substantially as discussed above, namely to prevent the apparatus 310, and particularly the bottom wall 83, from being disposed directly on the bottom of an evaporative cooler sump or bushing.

Extending through the bottom wall 83 are apertures 88 through which the water flows from the evaporative cooler sump into a siphon chamber 330 defined within the cylinder 312.

In operation, when the generally horizontal lower portion 8 of the drain hose 6 is raised or shaken, the water in the generally horizontal lower portion 8 will move backwardly or upwardly in the hose 6, compressing air within the siphon chamber 330, or perhaps even causing some of the water within the cylinder 312 to flow out of the cylinder 312 through the apertures 88. When the lower portion 8 is laid back down again, the water in the lower portion 8 will then move forwardly or downwardly and out, resulting in a low pressure area formed within the siphon chamber 330. That is, the air pressure within the cylinder 312, or within the siphon chamber 330, will be less than atmospheric pressure, and accordingly atmospheric pressure within the evaporative cooler housing (see FIG. 2 and. FIG. 15) will cause water to flow into the cylinder 312 through the apertures 88. The in flowing water then flows into the standpipe, and siphoning action will then commence to drain the water from the evaporative cooler sump.

Figure 18:
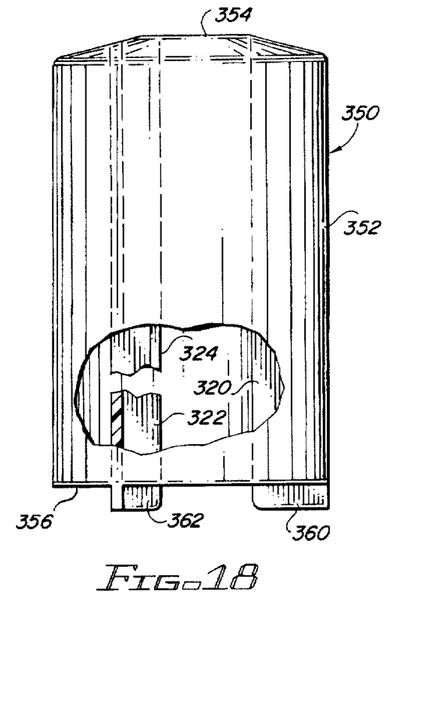
FIG. 18 is a side view of another alternate embodiment of the apparatus of the present invention.

FIG. 18 comprises a side view of still another embodiment 350 of the siphon drain apparatus of the present invention. The apparatus 350 is similar to the apparatus 310, except that the necessity of the bottom wall assembly 82 is obviated. Rather, the bottom of the apparatus 350 is open, with the fins extending downwardly below the cylinder to take the place of the stand off feet 84 of the bottom wall assembly 82.

The apparatus 350 includes a cylinder 352 closed by a top wall 354. At the bottom of the cylinder 352 is a rim 356. The bottom of the cylinder 352 is open. Extending radially inwardly into the cylinder 352 are three fins, and the three fins extend downwardly below the bottom rim 356 of the cylinder. Two of the fins, a fin 360 and a fin 362, are shown extending downwardly below the rim 356. The bottom of the three fins act as stand off feet and are accordingly disposed on the bottom of a cooler sump or on a bushing, etc., as discussed above.

The operation of the apparatus 350 is substantially the same as described above for the apparatus 310 of FIGS. 16 and 17. The three fins frictionally engage the standpipe 18, and the cylinder 352 may be adjusted vertically relative to the standpipe, as discussed above. Again, the lower portion 8 of the drain hose 6 is lifted and shaken, etc., to cause water therein to move rearwardly or upwardly in the hose, thus compressing the air within the cylinder 352. When the hose is laid back down on the ground, etc., the resulting forward or downward movement of the water in the hose causes low pressure to form within the cylinder 352, and atmospheric pressure then causes the water from the evaporative cooler sump to flow into the cylinder 352 through the open bottom, and into the standpipe and down, outwardly through the drain hose 6, as shown in FIG. 15.

The strainer basket 62 may be disposed about the cylinders 312 and 352 to strain out relatively large debris elements which may otherwise clog the standpipe and the drain hose, etc., as discussed above.

It will be noted that the siphon apparatus 310 and the siphon apparatus 350 are not connected to an evaporative cooler pump or to any other element other than a standpipe and a drain hose. Thus, the apparatus 310 and the apparatus 350 are completely independent of a pump, and of any timing system. Accordingly, the siphon draining of a cooler sump using the apparatus 310 or the apparatus 350 is carried out manually by simply raising, shaking, etc., the lower horizontal portion 8 of the drain hose 6. (See FIG. 15.)

It will be noted that the hose 6, or the lower portion 8 thereof, needs to be initially charged with water to cause the siphon action to begin. That is, there must be water in the lower, horizontal portion 8 of the drain hose 6 in order for the siphon process to begin.

Figure 19:
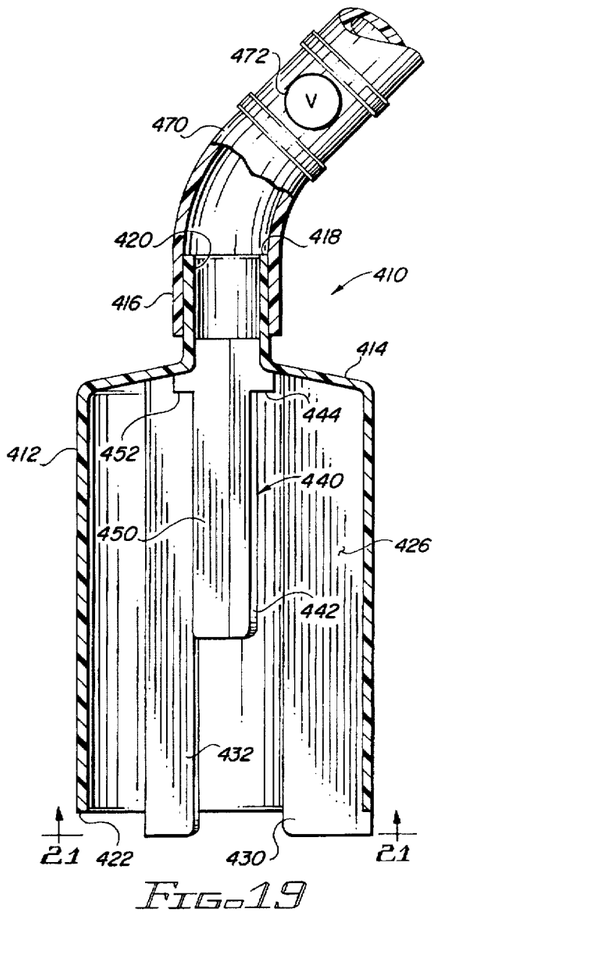
FIG. 19 is a view in partial section of another alternate embodiment of the apparatus of the present invention.
Figure 20:
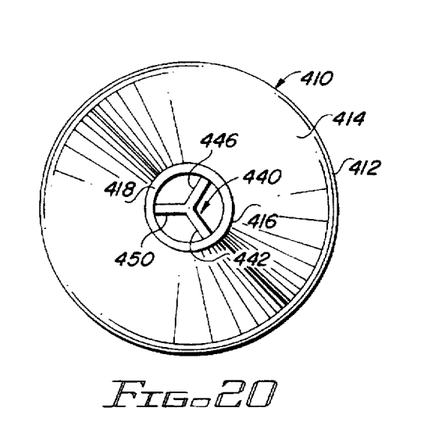
FIG. 20 is a top view of the apparatus of FIG. 19.
Figure 21:
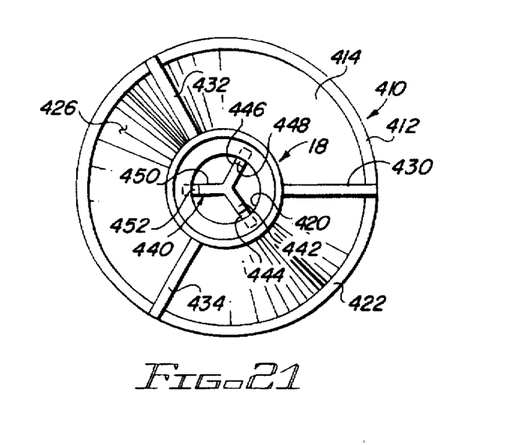
FIG. 21 is a view taken generally along line 21—21 of FIG. 19.

FIG. 19 is a view in partial section of siphon apparatus 410, which comprises another alternate embodiment of the apparatus of the present invention. FIG. 20 is a top view of the siphon apparatus 410, and FIG. 21 comprises a bottom view, taken generally along line 21—21 of FIG. 19 of the siphon apparatus 410. For the following discussion, reference will primarily be made to FIGS. 19, 20, and 21.

The siphon apparatus 410 is similar to the siphon apparatus 350, discussed above in conjunction with FIG. 18. However, siphon apparatus 410 includes elements which allow it to be connected to a source of water in addition to the drain hose 6 (see FIG. 15) for purposes of beginning a siphoning action.

The apparatus 410 includes a cylinder 412, with a top wall 414 closing the upper portion of the cylinder 412. A cylindrical extension 416, which comprises a top port or pipe, extends upwardly from the top wall 414. The top port or 416 is generally coaxially aligned with the cylinder 412.

The top port or pipe 416 includes a top rim 418. Extending through the top port or pipe 416 is a bore 420. The bore 420 communicates with the interior of the cylinder 412. The cylinder 412 includes a bottom rim 422. The bottom of the cylinder 412 is accordingly open, just as is the cylinder 352 of the apparatus 350. A siphon chamber 426 is defined within the cylinder 412 beneath the top wall 414.

Extending radially inwardly within the cylinder 412 from the walls of the cylinder 412 are three fins 430, 432, and 434. The three fins 430, 432, and 434 frictionally engage the standpipe 18, shown in FIG. 21, and allow the apparatus 410 to be adjusted vertically relative to the standpipe 18, as discussed above for the other embodiments of the present invention.

The bottoms of the three fins 430, 432, and 434 extend below the rim 422, and thus they also comprise, at their bottoms, standoff feet to allow the apparatus 410 to be disposed on the bottom of a cooler sump, or on a dimple, a bushing, etc., as discussed above in conjunction with the apparatus 410 of FIG. 18, and yet allow water from the cooler sump to flow into the interior of the cylinder 412 at the bottom rim 422.

Extending downwardly into the interior of the cylinder 412 from the bore 420 of the pipe 416 is a spacer 440. The spacer 440 includes three blades which extend downwardly into the cylinder 512 and into the interior of the standpipe 18. The three blades of the spacer 440 extend radially outwardly from the center axis of the cylinder 412.

The three blades include a blade 442, a blade 446, and a blade 450. Each blade includes a bottom shoulder which comprises a limit against which the standpipe 18 may be disposed. The shoulders include a shoulder 444 for the blade 442, a shoulder 448 for the blade 446, and a shoulder 452 for the blade 450. The shoulders 444, 448, and 452 are disposed downwardly from the top wall 414. The apparatus 410 is limited in its downward movement relative to the standpipe 18 by the three shoulders of the blades. However, the shoulders do not provide any limitation vertically upwardly with respect to the orientation or location of the apparatus 410 on a standpipe 18. The overall length of the spacer 440 within the cylinder 412 is preferably greater than about half the length or height of the cylinder 412, as may be understood from FIG. 19, and accordingly there is a relatively wide latitude in the vertical height or adjustment of the apparatus 410 relative to the standpipe 18.

While three blades are illustrated for the spacer 440, it will be understood that the spacer may include any desired or appropriate number of blades. It appears that three or four may be preferable, but a single diametrically extending blade with a pair of shoulders, or some other arrangement may also be used, if desired.

The spacer 440 essentially has two functions. One function is to limit the height of the standpipe 18 relative to the apparatus 410 such that the standpipe 18 cannot be disposed directly against the top wall 414. This assures that there will always be a space within the apparatus 410 for the overflow water from the evaporative cooler to flow out of the standpipe if the float 36 (see FIG. 2) becomes stuck and that there will always be a path for the water to flow through the standpipe during the draining of the sump.

A second purpose of the spacer 440 is to direct the flow of water from a conduit 470, shown in FIG. 19, into the standpipe 18.

The conduit 470 may be connected to any appropriate source of water, such as through a solenoid valve 472, which may in turn be appropriately connected to the pump 50 (See FIG. 2). The solenoid valve 472 may be actuated to provide a momentary bypass of the pumped water to the pipe or port 416. The use of such solenoid valve arrangement allows a quantity of water to be pumped to the apparatus 410 to begin the siphon action, and then the solenoid valve may close to resume pumping the water to the pads to keep the pads wet during the draining of the sump.

The water flowing through the conduit 470 and into the pipe 18 creates a low pressure area within the cylinder 412, and the water in the sump flows upwardly in the cylinder 412 in response to the low pressure and begins the siphoning action. This is essentially the same action as discussed above in conjunction with the apparatus 310 and 350 of FIGS. 16, 17, and 18.

Moreover, picking up the drain hose connected to the pipe 18, as discussed above in conjunction with FIGS. 15, 16, 17, and 18, will also commence the siphoning action of the apparatus 410. That is, the backward movement of the water in the drain hose portion 8, when the drain hose portion 8 is picked up, and then laid down, and the resulting movement of the water in the drain hose 8, as discussed above, creates a low pressure area within the siphon chamber 426 to cause the siphoning action to begin. The result is the draining of the sump of the evaporative cooler in which the apparatus 410 is disposed.

Obviously, the conduit 470 could also be connected to a separate pump (not shown) controlled by a timer, etc., to provide a flow of water into the pipe or port 416 to commence the siphoning action on a timed or periodic basis, or as desired.

An advantage of the apparatus 410 over the apparatus 310 or the apparatus 350 is the ability to have the siphon action commenced in either of two ways, the lifting of the drain hose portion 8 or the flowing of water through the conduit 470 to the pipe or port 416.

An advantage of the apparatus 410 over the apparatus 60 is the simplicity of the apparatus 410. The apparatus 410 may be molded as a single unit, with the three fins 430, 432, and 434 and the spacer 440 all molded as integral parts of the apparatus.

It will be noted that there are different ways to provide low pressure in the siphon chambers and to commence siphoning action, and a clear path is provided in each embodiment for the liquid, typically water, to flow into the siphon chambers and then out through the overflow pipe or tube.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements, without departing from those principles. The appended claims are intended to cover and embrace any and all such modifications, within the limits only of the true spirit and scope of the invention.

What I claim is:

1. Siphon apparatus for draining a slump from which a liquid is pumped upwardly comprising in combination:
   cylinder means, including a cylinder;
   a bottom wall on the cylinder;
   a central aperture extending through the bottom wall;
   a plurality of apertures extending through the bottom wall about the central aperture;
   a standpipe secured to the sump and disposed in the cylinder and extending through the central aperture;
   a top on the standpipe extending above the liquid in the sump;
   a top wall in the cylinder above the top of the standpipe for providing a siphon chamber in the cylinder about the standpipe;
   check valve means in the cylinder above the top wall, including
      a first pipe for receiving the liquid pumped upwardly from the sump,
      a second pipe communicating with the first pipe for receiving the pumped liquid from the first pipe,
      a third pipe communicating with the second pipe and with the siphon chamber in the cylinder for receiving the liquid from the second pipe in response to a cessation of the pumping of the liquid and through which the liquid flows to fill the siphon chamber to begin the siphoning action, and
      a valve for diverting the liquid in the second pipe to the third pipe in response to the cessation of pumping and for preventing the liquid in the second pipe from flowing downwardly in the first pipe, whereby the liquid in the second pipe flows into the third pipe and into the cylinder to fill the siphon chamber in the cylinder above the top of the standpipe to begin a siphoning action, and the liquid from the sump flow into the cylinder through the plurality of apertures in the bottom wall and outwardly through the standpipe to drain the sump.

2. The apparatus of claim 1 in which the cylinder means further includes a check valve disposed on the plurality of apertures in the bottom wall and the check valve is movable away from the plurality of apertures in response to the beginning of the siphoning action.

3. The apparatus of claim 1 in which the cylinder means further includes a plurality of fins to frictionally secure the cylinder to the standpipe to allow the cylinder to be adjusted relative to the standpipe.

4. The apparatus of claim 1 which further includes means for straining the liquid flowing into the cylinder through the plurality of apertures.

5. The apparatus of claim 4 in which the means for straining the liquid flowing into the cylinder comprises a basket disposed about the cylinder.

6. The apparatus of claim 5 in which the basket frictionally engages the cylinder to allow the basket to be adjusted relative to the cylinder as the cylinder is adjusted relative to the standpipe.

7. The apparatus of claim 5 in which the basket includes a plurality of slots for straining the liquid.

8. The apparatus of claim 1 in which the valve for diverting the liquid comprises a flapper valve pivoting between the third pipe and the first pipe.

9. The apparatus of claim 8 in which the check valve means further includes a tapered rim on the third pipe against which the flapper valve is disposed while the liquid is being pumped upwardly.

10. The apparatus of claim 9 in which the check valve means further includes a valve seat on the first pipe against which the flapper valve seats when the pumping of the liquid ceases and from which it pivots to the tapered rim of the third pipe in response to the pumping of the liquid to allow the liquid to be pumped upwardly through the second pipe.

11. The apparatus of claim 8 in which the second pipe of the check valve means includes an upper aperture through which the pumped liquid flows from the first pipe, and the upper aperture has a first diameter, and the third pipe includes a lower aperture through which the liquid flows from the second pipe, and the lower aperture has a diameter less than the diameter of the upper aperture.

12. The apparatus of claim 11 in which the flapper valve extends upwardly above the lower aperture to partially cover the upper aperture, whereby the liquid in the second pipe flows against the flapper valve upon the cessation of pumping to pivot the flapper valve against the valve seat on the first pipe.

13. The apparatus of claim 8 in which the check valve means further includes a compression spring disposed against the flapper valve to urge the flapper valve away from the third pipe and to the valve seat on the first pipe.

14. The apparatus of claim 13 in which the compression spring is disposed in the third pipe.

15. The apparatus of claim 8 in which the check valve means further includes a check valve on the first pipe upstream from the flapper valve and which opens in response to the pivoting of the flapper valve against the valve seat on the first pipe as the liquid in the first pipe begins to flow back upon the cessation of pumping to admit air to the first pipe to insure the continued back flow of liquid in the first pipe.

16. The apparatus of claim 1 in which the standpipe has an outer diameter and the central aperture has an inner diameter which is greater than the outer diameter of the standpipe to admit liquid to flow into the cylinder and about the standpipe.

17. The apparatus of claim 1 in which the second pipe is disposed above the third pipe and the second and third pipes are vertically aligned.

18. The apparatus of claim 17 in which the check valve means further includes a housing in which the valve for diverting the liquid pivots between the third pipe and the first pipe.

19. The apparatus of claim 17 in which the third pipe includes a tapered rim adjacent to the second pipe, and the valve for diverting the liquid is disposed against the tapered rim while the liquid is being pumped.

20. The apparatus of claim 17 in which the valve for diverting the liquid partially overlays the second pipe while the liquid is being pumped.

21. The apparatus of claim 1 in which the cylinder means further includes a plurality of feet on the cylinder for supporting the cylinder in the sump.

22. The apparatus of claim 21 in which the cylinder means further includes a ring about the central aperture and extending downwardly from the bottom wall.

23. The apparatus of claim 1 which further includes a reservoir disposed above the cylinder means for holding a quantity of the pumped liquid and communicating with the second pipe for receiving the pumped liquid from the second pipe.

24. In an evaporative cooler having a sump for holding water to be pumped upwardly by a pump to soak pads, apparatus for draining the slump by siphoning action comprising in combination:

an aperture in the slump;
a standpipe secured in the aperture for draining water from the sump, including a top on the standpipe;
cylinder means disposed about the standpipe, including
a cylinder,
a top wall in the cylinder above the top of the standpipe,
a bottom wall on the cylinder through which the standpipe extends,
a plurality of apertures extending through the bottom wall about the standpipe through which water flows into the cylinder during the siphoning action to drain the sump,
check valve means above the top wall, including
a check valve chamber for receiving water pumped by the pump,
a first pipe communicating with the check valve chamber and the pump through which the pumped water flows to the check valve chamber,
a second pipe communicating with the check valve chamber for receiving the pumped water and through which the pumped water flows upwardly to soak the pads,
a third pipe communicating with the check valve chamber and with the cylinder below the top wall for receiving water from the second pipe and the check valve chamber through which water flows to flood the cylinder below the top wall to begin the siphoning action through the standpipe upon the cessation of pumping, and
a valve in the check valve chamber for controlling the flow of water from the first pipe to the second pipe during the pumping of the water by the pump and from the second pipe to the third pipe upon the cessation of the pumping.

25. The apparatus of claim 24 in which the cylinder means further includes a check valve on the plurality of apertures in the bottom wall and which opens in response to the siphoning action to allow water from the sump to flow into the cylinder to drain the sump.

26. The apparatus of claim 24 in which the valve in the check valve chamber for controlling the flow of water comprises a flapper valve pivoting between the third pipe and the second pipe.

27. The apparatus of claim 24 which further includes a check valve on the first pipe opening in response to the cessation of pumping to admit air into the first pipe as the flapper valve pivots to the first pipe to insure that the water in the first pipe drains back to the pump.

28. The apparatus of claim 24 which further includes a drain hose connected to the standpipe below the evaporative cooler and through which water is drained from the sump.

29. The apparatus of claim 28 in which the drain hose includes a portion extending generally horizontally below the evaporative cooler to hold a quantity of the drained water, whereby raising the generally horizontal portion causes the water in the hose to flow backwardly in the hose and the siphoning action will be started when the hose is lowered to allow the water to flow forwardly.

30. The apparatus of claim 24 in which the cylinder is adjustably secured to the standpipe whereby the cylinder means may be moved vertically relative to the standpipe.

31. Drain apparatus for an evaporative cooler having a sump, water in the sump, an overflow standpipe, and a pump for pumping water comprising in combination:

a housing in the sump disposed about the standpipe;
a siphon chamber in the housing communicating with the sump for receiving water from the sump to be drained through the standpipe; and
means for filling the siphon chamber with water to a start a siphoning action to drain the sump including
a first pipe for receiving water pumped by the pump,
a second pipe for receiving water from the first pipe,
a third pipe communicating with the siphon chamber, and
a valve for diverting water from the second pipe to the third pipe.

32. The apparatus of claim 31 in which the means for filling the siphon chamber includes a drain hose connected to the standpipe for receiving water drained from the sump, and a first portion extending generally horizontal below the evaporative cooler in which water collects and lifting the first portion allows water to flow backwards from the lifted portion of the drain hose and then to flow forwardly in the drain hose when the first portion is lowered thereby lowering the atmospheric pressure in the siphon chamber whereby the siphoning action will start when the first portion is lowered.

33. A method of draining water from the sump of an evaporative cooler having a standpipe and a pump for pumping water to pads, comprising the steps of:

providing a chamber about the standpipe;
providing a path for water from the sump to flow into the chamber;
filling the chamber with water whereby the water will flow into the standpipe and out of the sump to commence siphoning action to drain the sump;
providing a drain hose for draining the water from the sump;
connecting the drain hose to the standpipe;
providing a horizontal portion for holding a quantity of water drained from the sump;
lifting the horizontal portion upwardly to cause the quantity of water to flow backwardly in the drain hose to compress air into the chamber; and
lowering the horizontal portion to allow the quantity of water to flow forwardly to allow the compressed air to follow the water to lower the air pressure in the chamber to cause the water to flow into the chamber to fill the chamber to commence the siphoning action.

34. The method of claim 33 in which the step of providing a path for water from the sump to flow into the chamber includes the steps of providing a bottom wall on the chamber, and providing a plurality of apertures through the bottom wall through which the water flows into the chamber.

35. The method of claim 34 which further includes the step of providing a check valve for the plurality of apertures.

36. The method of claim 33 in which the step of filling the chamber includes the steps of:

pumping the water upwardly from the slump to soak the pads, and
diverting the upwardly pumped water downwardly to fill the chamber.

37. The method of claim 36 which further includes the steps of:

turning off the pump to stop pumping the water upwardly,
providing a valve to divert the upwardly pumped water downwardly to fill the chamber.

38. Apparatus for draining water from the sump of an evaporative cooler having an overflow standpipe disposed in the sump comprising in combination:

cylinder means disposed above the standpipe to provide a siphon chamber;

a bottom on the cylinder means through which water from the sump flows into the cylinder means; and means for decreasing pressure in the siphon chamber of the cylinder means below atmospheric pressure to cause water from the sump to flow into the cylinder means and into the standpipe to begin a siphoning action to drain the sump.

39. The apparatus of claim 38 in which the means for decreasing the pressure in the siphon chamber of the cylinder means includes a valve for diverting water into the cylinder means to fill the siphon chamber therein and the water flows into the standpipe and decreases the pressure in the siphon chamber.

40. The apparatus of claim 38 in which the cylinder means includes a plurality of fins for frictionally engaging the standpipe.

41. The apparatus of claim 40 in which the fins extend below the bottom of the cylinder means to define feet on which the cylinder means may be disposed.

42. The apparatus of claim 38 in which the means for decreasing pressure in the siphon chamber of the cylinder means includes a drain hose secured to the standpipe, and the drain hose includes a generally horizontal portion having water therein, and moving the generally horizontal portion upwardly and then downwardly causes movement of the water therein and the movement of the water therein results in lower than atmospheric pressure in the siphon chamber.

43. The apparatus of claim 42 in which the cylinder means includes a cylinder closed by a top wall.

44. The apparatus of claim 43 in which the cylinder means further includes a port in the top wall through which water flows to lower the pressure in the siphon chamber below atmospheric pressure to start the siphon action.

45. The apparatus of claim 44 which further includes a conduit secured to the port for providing a flow of water to the standpipe.

46. The apparatus of claim 45 in which the cylinder means further includes a spacer extending from the port into the standpipe for directing water into the standpipe.

\* \* \* \* \*